(12) United States Patent
Matsunaga et al.

(10) Patent No.: US 10,953,867 B2
(45) Date of Patent: Mar. 23, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Hideki Matsunaga, Wako (JP); Yuki Oshitani, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 152 days.

(21) Appl. No.: 16/282,395

(22) Filed: Feb. 22, 2019

(65) Prior Publication Data
US 2019/0263391 A1   Aug. 29, 2019

(30) Foreign Application Priority Data

Feb. 26, 2018 (JP) .............................. JP2018-032261

(51) Int. Cl.
*B60W 30/02* (2012.01)
*B62D 6/00* (2006.01)
*B62D 6/04* (2006.01)
*G01C 21/26* (2006.01)
*G01C 21/00* (2006.01)
(Continued)

(52) U.S. Cl.
CPC ............ *B60W 30/02* (2013.01); *B62D 15/025* (2013.01); *G06K 9/00791* (2013.01); *B60W 2552/20* (2020.02); *B60W 2555/20* (2020.02); *B60W 2710/207* (2013.01); *G05D 1/0214* (2013.01); *G05D 1/0231* (2013.01); *G05D 1/0257* (2013.01)

(58) Field of Classification Search
CPC ........... B60W 30/02; B62D 6/00; B62D 6/04; B62D 15/02; B62D 53/026; B62M 27/02; G01C 21/26; G01C 21/00
See application file for complete search history.

(56) References Cited

U.S. PATENT DOCUMENTS 3,299,982 A * 1/1967 Bacon .................. B62D 53/026
                                                      180/265
3,779,326 A * 12/1973 Trautwein .............. B62M 27/02
                                                      180/190
(Continued)

FOREIGN PATENT DOCUMENTS

JP          62-037582           3/1987

*Primary Examiner* — Yuri Kan
(74) *Attorney, Agent, or Firm* — Amin, Turocy & Watson LLP (57) ABSTRACT

A vehicle control device (100) including a recognition unit (130) that that is configured to recognize a peripheral situation of a vehicle and a driving control unit (140, 166) that that is configured to control at least steering of the vehicle on the basis of a result of recognition acquired by the recognition unit, and, in a case in which the recognition unit is configured to recognize a road surface inclination area in which a gradient toward a lower side in a vertical direction is formed from a flat part of the road toward a road end, which is disposed at the road end of an advancement direction of the vehicle, and the vehicle is running on the road surface inclination area, the driving control unit is configured to adjust a steering angle of the vehicle in a direction in which the vehicle is away from the road end on a side on which the road surface inclination area is present.

7 Claims, 8 Drawing Sheets

(51) Int. Cl.
 *B62D 15/02* (2006.01)
 *G06K 9/00* (2006.01)
 *G05D 1/02* (2020.01)

(56) References Cited

U.S. PATENT DOCUMENTS

| | | | | |
|---|---|---|---|---|
| 8,954,233 | B2* | 2/2015 | Nakamura | B62D 6/06 |
| | | | | 701/41 |
| 9,097,527 | B2* | 8/2015 | Notstrand | G01C 11/00 |
| 2006/0178825 | A1* | 8/2006 | Eglington | G05D 1/0278 |
| | | | | 701/410 |
| 2012/0095649 | A1* | 4/2012 | Klier | B62D 6/04 |
| | | | | 701/41 |
| 2015/0025744 | A1* | 1/2015 | Banno | B62D 6/04 |
| | | | | 701/41 |
| 2017/0129536 | A1* | 5/2017 | Xu | B62D 15/025 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-032261, filed Feb. 26, 2018, the content of which is incorporated herein by reference.

BACKGROUND

Field of the Invention

The present invention relates to a vehicle control device, a vehicle control method, and a storage medium.

Description of Related Art

In recent years, automated control of vehicles has been researched. In relation to this, technologies for detecting a cross wind blown on a vehicle using a sensor and correcting a locus along which the vehicle runs by controlling a steering angle of a steering device on the basis of a detected result are known (for example, see Japanese Utility Patent Publication No. S62-037582).

SUMMARY

However, according to conventional technologies, a side wind is detected, and a steering angle of a steering device is adjusted, and thus driving control in a case in which the behavior of a vehicle becomes unstable due to the shape of a road surface of a road is not taken into account. For example, in a case in which a side wind is applied to a vehicle, a force is uniformly applied to the whole vehicle body. However, the shape of a road surface does not uniformly act on all the vehicle wheels. For this reason, even when conventional technologies are applied to changes in the road surface, there are cases in which the behavior of a vehicle cannot be appropriately controlled.

The present invention is in consideration of such situations, and one object thereof is to provide a vehicle control device, a vehicle control method, and a storage medium capable of limiting a disturbance of the behavior of a vehicle due to the shape of the road surface of the road.

A vehicle control device, a vehicle control method, and a storage medium according to the present invention employ the following configurations.

(1): A vehicle control device according to one aspect of the present invention is a vehicle control device including: a recognition unit that is configured to a peripheral situation of a vehicle; and a driving control unit that is configured to control at least steering of the vehicle on the basis of a result of recognition acquired by the recognition unit, wherein, in a case in which the recognition unit is configured to recognize a road surface inclination area in which a gradient toward a lower side in a vertical direction is formed from a flat part of the road toward a road end, which is disposed at the road end of an advancement direction of the vehicle, and the vehicle is running on the road surface inclination area, the driving control unit is configured to adjust a steering angle of the vehicle in a direction in which the vehicle is away from the road end on a side on which the road surface inclination area is present.

(2): In the aspect (1) described above, the driving control unit is configured to cause the vehicle to run in the flat area in a case in which the recognition unit is configured to recognize a flat area, which is adjacent to the road surface inclination area, farther from a center part of the road than the road surface inclination area.

(3): In the aspect (1) described above, the driving control unit is configured to execute a process for adjusting the steering angle of the vehicle in a direction in which the vehicle is away from the road end on a side on which the road surface inclination area is present in a case in which a speed of the vehicle is equal to or lower than a predetermined value.

(4): In the aspect (1) described above, the recognition unit further is configured to recognize a gradient of the road surface inclination area, and the driving control unit is configured to determine an amount of adjustment of the steering angle in accordance with the gradient recognized by the recognition unit.

(5): In the aspect (1) described above, the driving control unit is configured to cause the vehicle to run in the road surface inclination area in a case in which an obstacle is unavoidable in the flat part of the road.

(6): In the aspect (1) described above, the recognition unit further is configured to recognize presence and a width of a side ditch present on a side farther from a center part of the road than the road surface inclination area, and the driving control unit is configured to determine an amount of adjustment of the steering angle in accordance with a width of the side ditch recognized by the recognition unit.

(7): A vehicle control method according to one aspect of the present invention is a vehicle control method in which a vehicle control device is configured to recognize a peripheral situation of a vehicle and controls at least steering of the vehicle on the basis of a result of recognition, the vehicle control method including: recognizing a road surface inclination area, which is disposed at the road end of an advancement direction of the vehicle, in which a gradient toward a lower side in a vertical direction is formed from a flat part of the road toward a road end, and adjusting a steering angle of the vehicle in a direction in which the vehicle is away from the road end on a side on which the road surface inclination area is present in a case in which the vehicle runs on the road surface inclination area.

(8): A storage medium according to one aspect of the present invention is a computer-readable non-transitory storage medium having a program stored thereon, the program causing a vehicle control device to execute: recognizing a peripheral situation of a vehicle; and controlling at least steering of the vehicle on the basis of a result of recognition, wherein the program causing the vehicle control device to execute: recognizing a road surface inclination area, which is disposed at the road end of an advancement direction of the vehicle, in which a gradient toward a lower side in a vertical direction is formed from a flat part of the road toward a road end, and adjusting a steering angle of the vehicle in a direction in which the vehicle is away from the road end on a side on which the road surface inclination area is present in a case in which the vehicle runs on the road surface inclination area.

According to the aspects (1) to (8) described above, disturbances of the behavior of a vehicle due to the shape of the road surface of a road can be inhibited.

According to the aspect (2) described above, by causing a vehicle to run on a stable road surface, the process of control of a steering device can be further reduced.

According to the aspect (3) described above, by limiting the speed at which control is performed, the process of control of a steering device can be further reduced.

According to the aspect (4) described above, the behavior of a vehicle can be further stabilized in accordance with a change in the state of a road surface.

According to the aspect (5) described above, the behavior of a vehicle can be further stabilized also in the case of vehicles passing each other on a narrow road.

According to the aspect (6) described above, the behavior of a vehicle can be further stabilized in accordance with a gradient of the road surface predicted on the basis of the width of a side ditch.

DETAILED DESCRIPTION OF THE INVENTION

Hereinafter, a vehicle control device, a vehicle control method, and a storage medium according to embodiments of the present invention will be described with reference to the drawings. Hereinafter, although a case in which a rule of left-side traffic is applied will be described, the left side and the right side may be interchanged in a case in which a rule of right-side traffic is applied.

[Entire Configuration]

Figure 1:
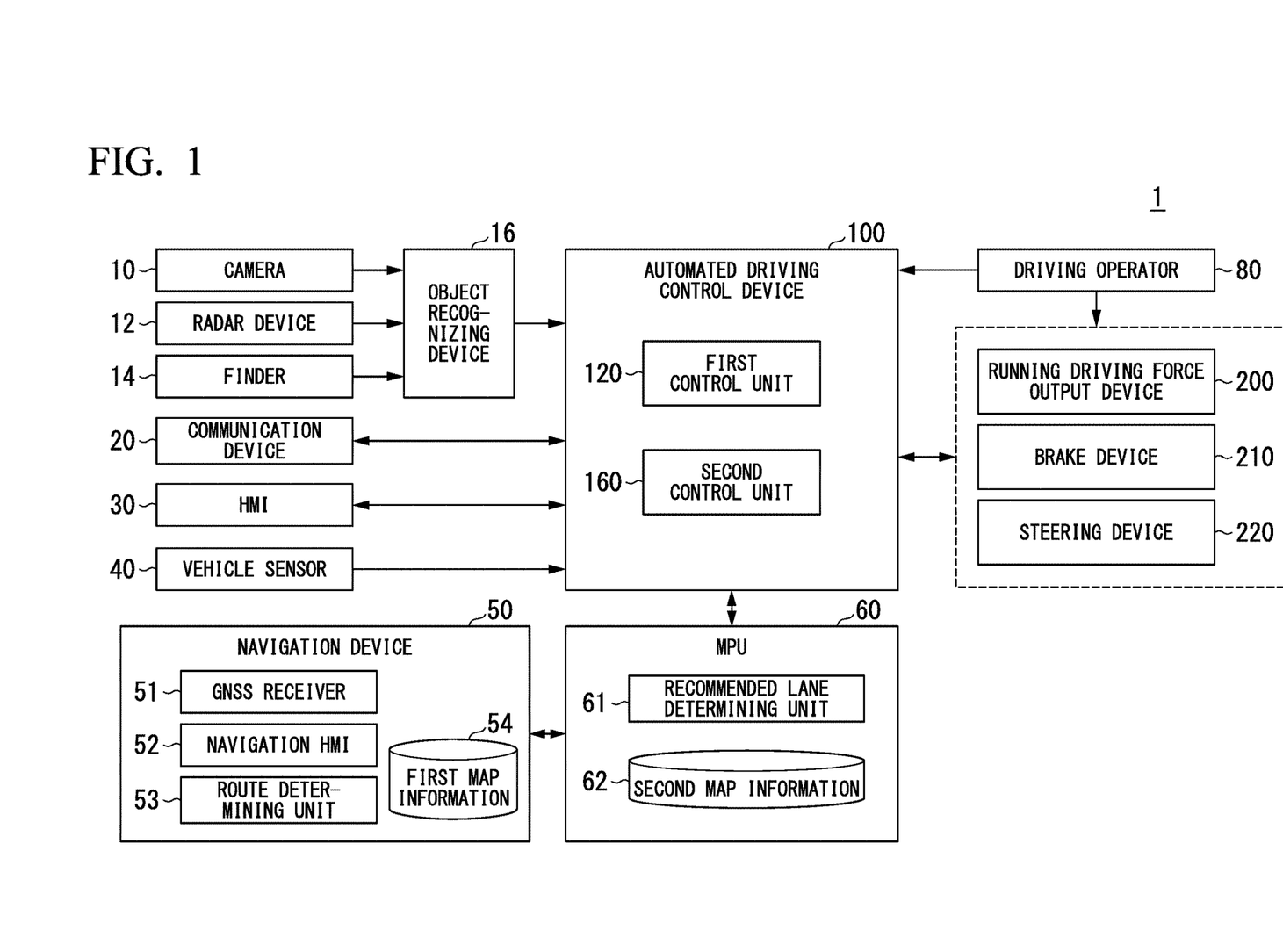
FIG. 1 is a configuration diagram of a vehicle control system using an automated driving control device according to an embodiment.

FIG. 1 is a configuration diagram of a vehicle control system 1 using an automated driving control device according to an embodiment. A vehicle in which the vehicle control system 1 is mounted is, for example, a vehicle having two wheels, three wheels, four wheels, or the like, and a driving source thereof is an internal combustion engine such as a diesel engine or a gasoline engine, an electric motor, or a combination thereof. The electric motor operates using power generated using a power generator connected to an internal combustion engine or power discharged from a secondary cell or a fuel cell.

The vehicle control system 1, for example, includes a camera 10, a radar device 12, a finder 14, an object recognizing device 16, a communication device 20, a human machine interface (HMI) 30, a vehicle sensor 40, a navigation device 50, a map positioning unit (MPU) 60, a driving operator 80, a vehicle control device 100, a running driving force output device 200, a brake device 210, and a steering device 220. Such devices and units are interconnected using a multiplex communication line such as a controller area network (CAN) communication line, a serial communication line, a radio communication network, or the like. The configuration shown in FIG. 1 is merely one example, and thus parts of the configuration may be omitted or other additional components may be added.

The camera 10, for example, is a digital camera using a solid-state imaging device such as a charge coupled device (CCD) or a complementary metal oxide semiconductor (CMOS). The camera 10 is installed at an arbitrary place on a vehicle in which the vehicle control system 1 is mounted (hereinafter referred to as a subject vehicle M). In the case of forward imaging, the camera 10 is installed at an upper part of a front windshield, a rear face of a rear-view mirror, or the like. The camera 10, for example, repeatedly images the vicinity of the subject vehicle M periodically. The camera 10 may be a stereo camera.

The radar device 12 emits radio waves such as millimeter waves to the vicinity of the subject vehicle M and detects at least a position of (a distance and an azimuth to) an object by detecting radio waves (reflected waves) reflected by the object. The radar device 12 is installed at an arbitrary place on the subject vehicle M. The radar device 12 may detect a position and a speed of an object using a frequency modulated continuous wave (FM-CW) system.

The finder 14 is a light detection and ranging (LIDAR) device. The finder 14 emits light to the vicinity of the subject vehicle M and measures scattered light. The finder 14 detects a distance to a target on the basis of a time from light emission to light reception. The emitted light, for example, is pulse-form laser light. The finder 14 is mounted at an arbitrary position on the subject vehicle M.

The object recognizing device 16 may perform a sensor fusion process on results of detection using some or all of the camera 10, the radar device 12, and the finder 14, thereby allowing recognition of a position, a type, a speed, and the like of an object. The object recognizing device 16 outputs a result of recognition to the vehicle control device 100. The object recognizing device 16 may output results of detection using the camera 10, the radar device 12, and the finder 14 to the vehicle control device 100 as they are. The object recognizing device 16 may be omitted from the vehicle control system 1.

The communication device 20, for example, communicates with other vehicles present in the vicinity of the subject vehicle M using a cellular network, a Wi-Fi network, Bluetooth (registered trademark), dedicated short range communication (DSRC), or the like or communicates with various server apparatuses through a radio base station.

The HMI 30 presents various types of information to an occupant of the subject vehicle M and receives an input operation performed by a vehicle occupant. The HMI 30 may include various display devices, a speaker, a buzzer, a touch panel, switches, keys, and the like.

The vehicle sensor 40 includes a vehicle speed sensor that detects a speed of the subject vehicle M, an acceleration sensor that detects an acceleration, a yaw rate sensor that detects an angular velocity around a vertical axis, an azimuth sensor that detects the azimuth of the subject vehicle M, and the like. The vehicle sensor 40, for example, includes an inclination sensor that detects a gradient in the crossing direction of a road. The inclination sensor, for example, may detect a difference between gradients of road surfaces on which left and right vehicle wheels run.

The navigation device 50, for example, includes a global navigation satellite system (GNSS) receiver 51, a navigation HMI 52, and a route determining unit 53. The navigation device 50 stores first map information 54 in a storage device such as a hard disk drive (HDD) or a flash memory. The GNSS receiver 51 identifies a position of a subject vehicle M on the basis of signals received from GNSS satellites. The position of the subject vehicle M may be identified or complemented by an inertial navigation system (INS) using an output of the vehicle sensor 40. The navigation HMI 52 includes a display device, a speaker, a touch panel, a key, and the like. A part or the whole of the navigation HMI 52 and the HMI 30 described above may be configured to be shared. The route determining unit 53, for example, determines a route to a destination input by a vehicle occupant using the navigation HMI 52 (hereinafter referred to as a route on a map) from a position of the subject vehicle M identified by the GNSS receiver 51 (or an input arbitrary position) by referring to the first map information 54. The first map information 54, for example, is information in which a road form is represented by respective links representing roads and respective nodes connected using the links. The first map information 54 may include a curvature of each road, point of interest (POI) information, and the like. The route on the map is output to the MPU 60. In addition, the navigation device 50 may perform route guidance using the navigation HMI 52 on the basis of the route on the map. The navigation device 50, for example, may be realized by a function of a terminal device such as a smartphone or a tablet terminal held by a vehicle occupant. In addition, the navigation device 50 may transmit a current location and a destination to a navigation server through the communication device 20 and acquire a route equivalent to the route on the map received from the navigation server.

The MPU 60, for example, includes a recommended lane determining unit 61 and stores second map information 62 in a storage device such as an HDD or a flash memory. The recommended lane determining unit 61 divides the route on the map provided from the navigation device 50 into a plurality of blocks (for example, divides the route into blocks of 100 [m] in the advancement direction of the vehicle) and determines a recommended lane for each block by referring to the second map information 62. The recommended lane determining unit 61 determines in which of lanes numbered from the left side to run. In a case in which there is a branching place in the route on the map, the recommended lane determining unit 61 determines a recommended lane such that the subject vehicle M can run along a reasonable route for advancement to a branching destination.

The second map information 62 is map information having higher accuracy than the first map information 54. The second map information 62, for example, includes information on the centers of respective lanes, information on boundaries between lanes, or the like. In addition, in the second map information 62, road information, traffic regulation information, address information (addresses and postal codes), facility information, telephone number information, and the like may be included. The second map information 62 may be updated as needed by the communication device 20 communicating with another device.

The driving operator 80, for example, includes an acceleration pedal, a brake pedal, a shift lever, a steering wheel, a steering wheel variant, a joystick, and other operators. A sensor detecting the amount of an operation or the presence/absence of an operation is installed in the driving operator 80, and a result of the detection is output to the vehicle control device 100 (automated driving control device) or some or all of the running driving force output device 200, the brake device 210, and the steering device 220.

The vehicle control device 100, for example, includes a first control unit 120 and a second control unit 160. Each of the first control unit 120 and the second control unit 160, for example, is realized by a hardware processor such as a central processing unit (CPU) executing a program (software). In addition, some or all of these constituent elements may be realized by hardware (a circuit unit; including circuitry) such as a large scale integration (LSI), an application specific integrated circuit (ASIC), a field-programmable gate array (FPGA), or a graphics processing unit (GPU) or may be realized by software and hardware in cooperation. The program may be stored in a storage device such as a hard disk drive (HDD) or a flash memory of the vehicle control device 100 in advance or may be stored in a storage medium such as a DVD or a CD-ROM that can be loaded or unloaded and installed in an HDD or a flash memory of the vehicle control device 100 by loading the storage medium into a drive device.

Figure 2:
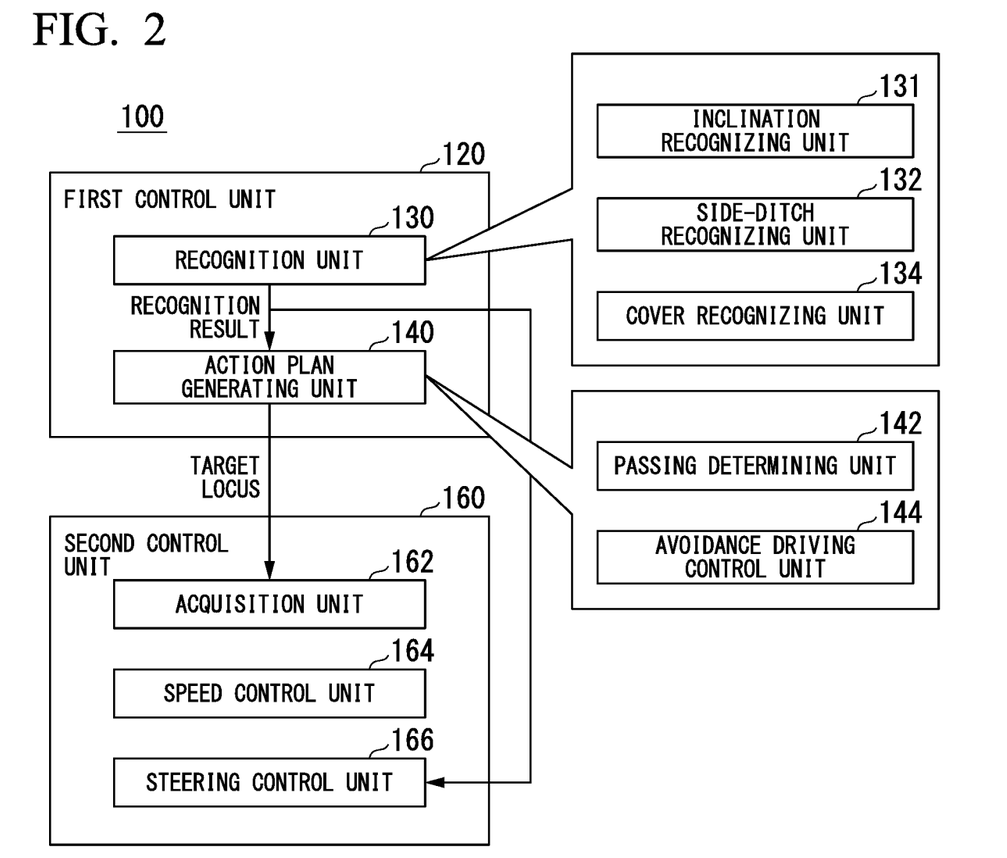
FIG. 2 is a functional configuration diagram of a first control unit and a second control unit.

FIG. 2 is a functional configuration diagram of the first control unit 120 and the second control unit 160. The first control unit 120, for example, includes a recognition unit 130 and an action plan generating unit 140. The first control unit 120, for example, simultaneously realizes functions using artificial intelligence (AI) and functions using a model provided in advance. For example, a function of "recognizing an intersection" may be realized by executing recognition of an intersection using deep learning or the like and recognition based on conditions given in advance (a traffic light, road markings, and the like that can be used for pattern matching are present) at the same time and comprehensively evaluating both recognitions by assigning scores to them. Accordingly, the reliability of automated driving is secured.

The recognition unit 130 recognizes states (peripheral situations) such as a position, a speed, an acceleration, and the like of each object present in the vicinity of the subject vehicle M on the basis of information input from the camera 10, the radar device 12, and the finder 14 through the object recognizing device 16. Among objects, for example, moving bodies such as a pedestrian, a bicycle, other vehicles and obstacles such as construction sites are included. The position of an object, for example, is recognized as a position in an absolute coordinate system having a representative point (the center of gravity, the center of a driving shaft, or the like) of the subject vehicle M as its origin and is used for control. The position of an object may be represented as a representative point such as the center of gravity or a corner of an object or may be represented in a represented area. A "state" of the object may include an acceleration, a jerk, or an "action state" (for example, whether or not the object is changing lanes or is to change lanes) of an object.

The recognition unit 130, for example, recognizes a lane (running lane) in which the subject vehicle M is running. For example, the recognition unit 130 may recognize a running lane by comparing a pattern of road partition lines acquired from the second map information 62 (for example, an array of solid lines and broken lines) with a pattern of road partition lines in the vicinity of the subject vehicle M that has been recognized from an image captured by the camera 10. The recognition unit 130 is not limited to recognizing road partition lines and may recognize a running lane by recognizing running road boundaries (road boundaries) including a road partition line, a road shoulder, curbstones, a median strip, a guardrail, and the like. In the recognition, the position of the subject vehicle M acquired from the navigation device 50 or a result of the process executed by an INS may be additionally taken into account. The recognition unit 130 recognizes a width of a road on which the subject vehicle M runs. In this case, the recognition unit 130 may recognize a road width from an image captured by the camera 10 or may recognize a road width from a road partition line acquired from the second map information 62. The recognition unit 130 may recognize the width (for example, a vehicle width of another vehicle), the height, the shape, and the like of an obstacle on the basis of an image captured by the camera 10. The recognition unit 130 recognizes a stop line, a red light, a toll gate, and other road events. The recognition unit 130, as will be described later, recognizes a groove, a level difference, an inclination, a flat area, and the like disposed on a road among road events.

When a running lane is recognized, the recognition unit 130 recognizes a position and a posture of the subject vehicle M with respect to the running lane. The recognition unit 130, for example, may recognize a deviation of a reference point on the subject vehicle M from the center of the lane and an angle of the advancement direction of the subject vehicle M formed with a line acquired by aligning the centers of the lane as a relative position and a posture of the subject vehicle M with respect to the running lane. Instead of this, the recognition unit 130 may recognize a position of a reference point on the subject vehicle M with respect to a one side end part (a road partition line or a road boundary) of the running lane or the like as a relative position of the subject vehicle M with respect to the running lane.

The recognition unit 130 may recognize structures (for example, a telegraph pole, a median strip, and the like) on a road on the basis of the first map information 54 or the second map information 62. The functions of an inclination recognizing unit 131, a side-ditch recognizing unit 132, and a cover recognizing unit 134 of the recognition unit 130 will be described later.

The action plan generating unit 140 automatically (without depending on a driver's operation) generates a target locus along which the subject vehicle M will run in the future such that the subject vehicle basically can run on a recommended lane determined by the recommended lane determining unit 61 and can respond to a peripheral situation of the subject vehicle M. The target locus, for example, includes a speed element. For example, the target locus is represented as a sequence of places (locus points) at which the subject vehicle M will arrive. A locus point is a place at which the subject vehicle M will arrive at respective predetermined running distances (for example, about every several [m]) as distances along the road, and separately from that, a target speed and a target acceleration for each of predetermined sampling times (for example, a fraction of a [sec]) are generated as a part of the target locus. A locus point may be a position at which the subject vehicle M will arrive at a predetermined sampling time for each of the sampling time. In such a case, information of a target speed or a target acceleration is represented using intervals between the locus points.

When a target locus is generated, the action plan generating unit 140 may set an event of automated driving. As events of automated driving, there are a constant-speed running event, a low-speed running-behind event, a lane change event, a branching event, a merge event, an overtaking event, and the like. The action plan generating unit 140 generates a target locus according to operated events. For example, in a case in which the subject vehicle M runs on a narrow road R1, the action plan generating unit 140 generates a target locus deviating to the center of the road RE The action plan generating unit 140 generates a target locus such that it does not run on road surface inclination areas QL and QR as possibly. The functions of a passing determining unit 142 and an avoidance driving control unit 144 of the action plan generating unit 140 will be described later.

The second control unit 160 performs control of the running driving force output device 200, the brake device 210, and the steering device 220 such that the subject vehicle M passes along a target locus generated by the action plan generating unit 140 at a scheduled time.

The second control unit 160, for example, includes an acquisition unit 162, a speed control unit 164, and a steering control unit 166. The acquisition unit 162 acquires information of a target locus (locus points) generated by the action plan generating unit 140 and stores the target locus information in a memory (not shown). The speed control unit 164 controls the running driving force output device 200 or the brake device 210 on the basis of a speed element accompanying the target locus stored in the memory. A combination of the action plan generating unit 140 and the steering control unit 166 described above is one example of a "driving control unit." The steering control unit 166 controls the steering device 220 in accordance with a degree of curvature of the target locus stored in the memory. The processes of the speed control unit 164 and the steering control unit 166, for example, are realized by a combination of feed forward control and feedback control. For example, the steering control unit 166 may execute feed forward control according to the curvature of a road in front of the subject vehicle M and feedback control based on a deviation from the target locus in combination. A detailed function of the steering control unit 166 will be described later.

The running driving force output device 200 outputs a running driving force (torque) used for a vehicle to run to driving wheels. The running driving force output device 200, for example, includes a combination of an internal combustion engine, an electric motor, a transmission, and the like and an ECU controlling these components. The ECU controls the components described above in accordance with information input from the second control unit 160 or information input from the driving operator 80.

The brake device 210, for example, includes a brake caliper, a cylinder that delivers hydraulic pressure to the brake caliper, an electric motor that generates hydraulic pressure in the cylinder, and a brake ECU. The brake ECU performs control of the electric motor in accordance with information input from the second control unit 160 or information input from the driving operator 80 such that a brake torque according to a brake operation is output to each vehicle wheel. The brake device 210 may include a mechanism delivering hydraulic pressure generated in accordance with an operation on the brake pedal included in the driving operators 80 to the cylinder through a master cylinder as a backup. The brake device 210 is not limited to the configuration described above and may be an electronically-controlled hydraulic brake device that delivers hydraulic pressure in the master cylinder to a cylinder by controlling an actuator in accordance with information input from the second control unit 160.

The steering device 220, for example, includes a steering ECU and an electric motor. The electric motor, for example, changes the direction of the steering wheel by applying a force to a rack and pinion mechanism. The steering ECU changes the direction of the steering wheel by driving an electric motor in accordance with information input from the second control unit 160 or information input from the driving operator 80.

[Road Structure]

Figure 3:
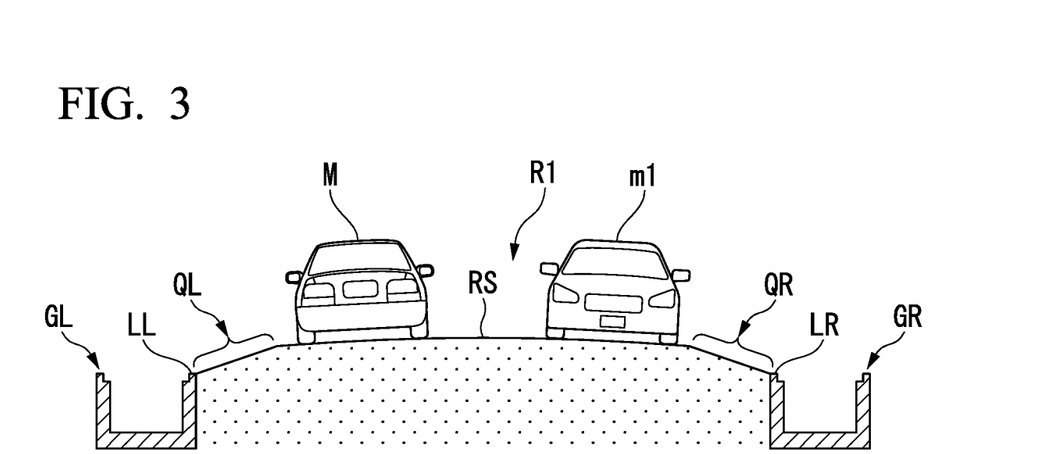
FIG. 3 is a diagram showing side ditches and road surface inclination areas disposed on a road.
Figure 4:
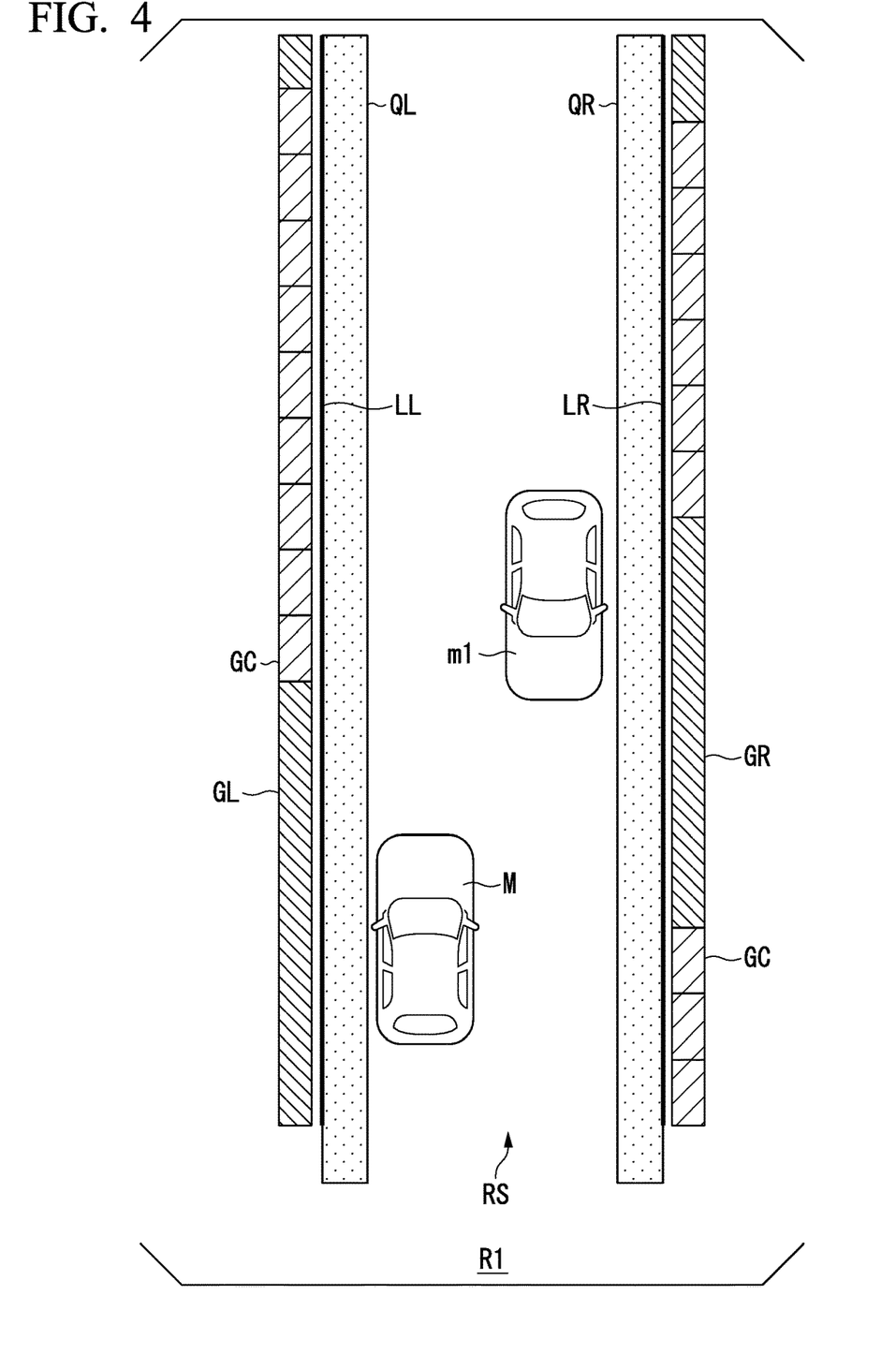
FIG. 4 is a diagram showing one example of a process of a side-ditch recognizing unit.

FIG. 3 is a cross-sectional view showing the structure of a road. In order to describe inclination areas of a road, FIG. 3 shows a cross-sectional view of the road in the crossing direction. FIG. 4 is a plan view showing the structure of a road.

Road surface inclination areas QL and QR, for example, are disposed on the road R1 side such that they extend along road ends LL and LR. The road surface inclination areas QL and QR are areas disposed for natural drainage of water such as rainwater fallen on the road R1 into side ditches GL and GR. The gradients of the road surface inclination areas QL and QR are formed in the crossing direction of the road RE The gradients are formed such that the height is lowered from the center of the road R1 toward the road ends LL and LR. The road surface inclination areas QL and QR are areas in which not inclinations disposed on a curved road or an inclining road but gradients toward the lower side in the vertical direction are formed from a flat part of the road toward the road ends.

The road surface inclination areas QL and QR, for example, are disposed with gradients higher than the gradient of a flat part RS of the road RE Although the gradients of the road surface inclination areas QL and QR, for example, are constant, the gradients may be formed as continuously increasing toward the road ends.

There are cases in which side ditches GL and GR are disposed on the outer sides of the road R1 adjacent to the road surface inclination areas QL and QR. The side ditches GL and GR are, for example, grooves for collecting rainwater and the like on the road surface of the road R1 and draining the rainwater to the outside of the road RE The side ditches GL and GR, for example, are formed to have a U-shaped cross-section and extend along the road ends LL and LR in a state in which they are embedded in the ground. The side ditches GL and GR have opening parts, for example, formed at approximately same heights as those of the road ends LL and LR. For example, there are cases in which, as will be described later, covers are placed in the opening parts of the side ditches GL and GR.

A cover GC, for example, includes a plate-shaped body formed using a steel plate, a wood plate, concrete, or the like and a grating formed in a cover shape by assembling steel materials together. The grating has a function of draining water to a side ditch in a state in which it is placed in the side ditch. The cover GC may be continuously placed on the side ditches GL and GR in the extending direction of the road R1.

When the subject vehicle M runs on an inclination disposed on a road, there is a possibility that the subject vehicle M will turn toward the lower side of the inclination. For this reason, by using the function of each functional unit to be described below, a locus along which the subject vehicle M runs is corrected.

Hereinafter, a detailed configuration of the recognition unit 130 will be described. The recognition unit 130, for example, includes an inclination recognizing unit 131, a side-ditch recognizing unit 132, and a cover recognizing unit 134.

[Function of Inclination Recognizing Unit]

The inclination recognizing unit 131 recognizes road surface inclination areas disposed at the road ends LL and LR. For example, the inclination recognizing unit 131 reads information of the road surface inclination areas QL and QR by referring to the second map information 62 and recognizes the road surface inclination areas QL and QR. The inclination recognizing unit 131 may recognize the road surface inclination area QL disposed near the road end LL on the left side of the road R1 by analyzing an image captured by the camera 10. The inclination recognizing unit 131 may further recognize the road surface inclination area QR disposed near the road end LR on the right side of the road R1 in addition to the road surface inclination area QL. Other than that, the inclination recognizing unit 131 may recognize a road surface inclination area by referring to the second map information 62 in a case in which the subject vehicle runs on the same road by adding information of a road surface inclination area recognized using an image captured by the camera 10 to the second map information 62 in association with a position.

The inclination recognizing unit 131 may estimate the magnitudes of the gradients of the road surface inclination areas QL and QR on the basis of widths of the side ditches GL and GR recognized by the side-ditch recognizing unit 132 to be described later. The inclination recognizing unit 131, for example, estimates the gradients as being higher as the widths of the groove widths WGL and WGR of the side ditches GL and GR become larger. The reason for this is that the magnitudes of the groove widths WGL and WGR are proportional to the amounts of water drainage of the side ditches GL and GR, and it is predicted that the amounts of inclinations of gradients of water disposed on the road R1 will increase in proportion thereto.

[Function of Side-Ditch Recognizing Unit]

The side-ditch recognizing unit 132 recognizes side ditches of a road on which the subject vehicle M runs. The side-ditch recognizing unit 132, for example, analyzes an image captured by the camera 10 and recognizes side ditches disposed near road ends on the basis of the analyzed image.

The side-ditch recognizing unit 132, for example, recognizes the side ditches GL and GR disposed on the left and right sides of the road R1. The side-ditch recognizing unit 132 may estimate the side ditches GL and GR by reading information of the road surface inclination areas QL and QR by referring to the second map information 62. Other than that, the side-ditch recognizing unit 132 may recognize side ditches by referring to the second map information 62 in a case in which the subject vehicle runs on the same road by adding information of the side ditches recognized using an image captured by the camera 10 to the second map information 62 in association with a position.

The side-ditch recognizing unit 132, for example, may recognize grooves having a predetermined depth or more as grooves and not recognize grooves of less than a predetermined depth as grooves. Here, the predetermined depth, for example, is such a depth that vehicle wheels of the subject vehicle M derails into the side ditch, or running is inhibited. The side-ditch recognizing unit 132 may recognize the groove widths WGL and WGL of the side ditches GL and GR.

[Function of Cover Recognizing Unit]

The cover recognizing unit 134, for example, recognizes covers GC placed on the side ditches GL and GR recognized by the side-ditch recognizing unit 132 by analyzing an image captured by the camera 10. For example, the cover recognizing unit 134 acquires luminance levels by analyzing an image captured by the camera 10 and differently recognizes the side ditch GL and the cover GC on the basis of a difference between acquired luminance levels. The cover recognizing unit 134 may detect a distance to a target acquired by the finder 14 and differently recognize the side ditch GL and the cover GC by recognizing stereoscopic shapes of the side ditch GL and the cover GC. Other than that, the cover recognizing unit 134 may recognize a cover by referring to the second map information 62 in the case of running on the same road by adding information of on cover recognized by the camera 10 to the second map information 62 in association with the position.

The cover recognizing unit 134 may estimate a material of the cover GC from a luminance level, a color, a pattern, and the like on the basis of a result of analysis of an image captured by the camera 10. The cover recognizing unit 134 may recognize a distance GCL in which the recognized cover GC is continuous along a road RE Here, "the cover GC being continuous along the road R1," for example, represents that a gap between a cover and a cover is aligned at a narrow interval that is within a predetermined distance. The predetermined distance, for example, is a distance for which the wheels of the subject vehicle M can run over the covers without derailing.

The cover recognizing unit 134 may recognize the presence of the cover GC on the basis of a locus along which a preceding vehicle has run. For example, in a case in which a preceding vehicle runs without stopping for a predetermined time or more on an area in which the presence of a side ditch is recognized, the cover recognizing unit 134 recognizes that there is a cover GC on the side ditch. For example, in a case in which there is a flat area over which the vehicle wheel can run between the road surface inclination area and the cover GC, the cover recognizing unit 134 may recognize it as a flat area integrated with the cover GC.

Hereinafter, a detailed configuration of the action plan generating unit 140 will be described. The action plan generating unit 140, for example, includes a passing determining unit 142 and an avoidance driving control unit 144 (FIG. 2).

[Function of Passing Determining Unit]

In a case in which an obstacle is recognized in the advancement direction of the subject vehicle M by the recognition unit 130, the passing determining unit 142 determines whether or not the subject vehicle and the obstacle can pass each other on the basis of a target locus generated by the action plan generating unit 140.

Figure 5:
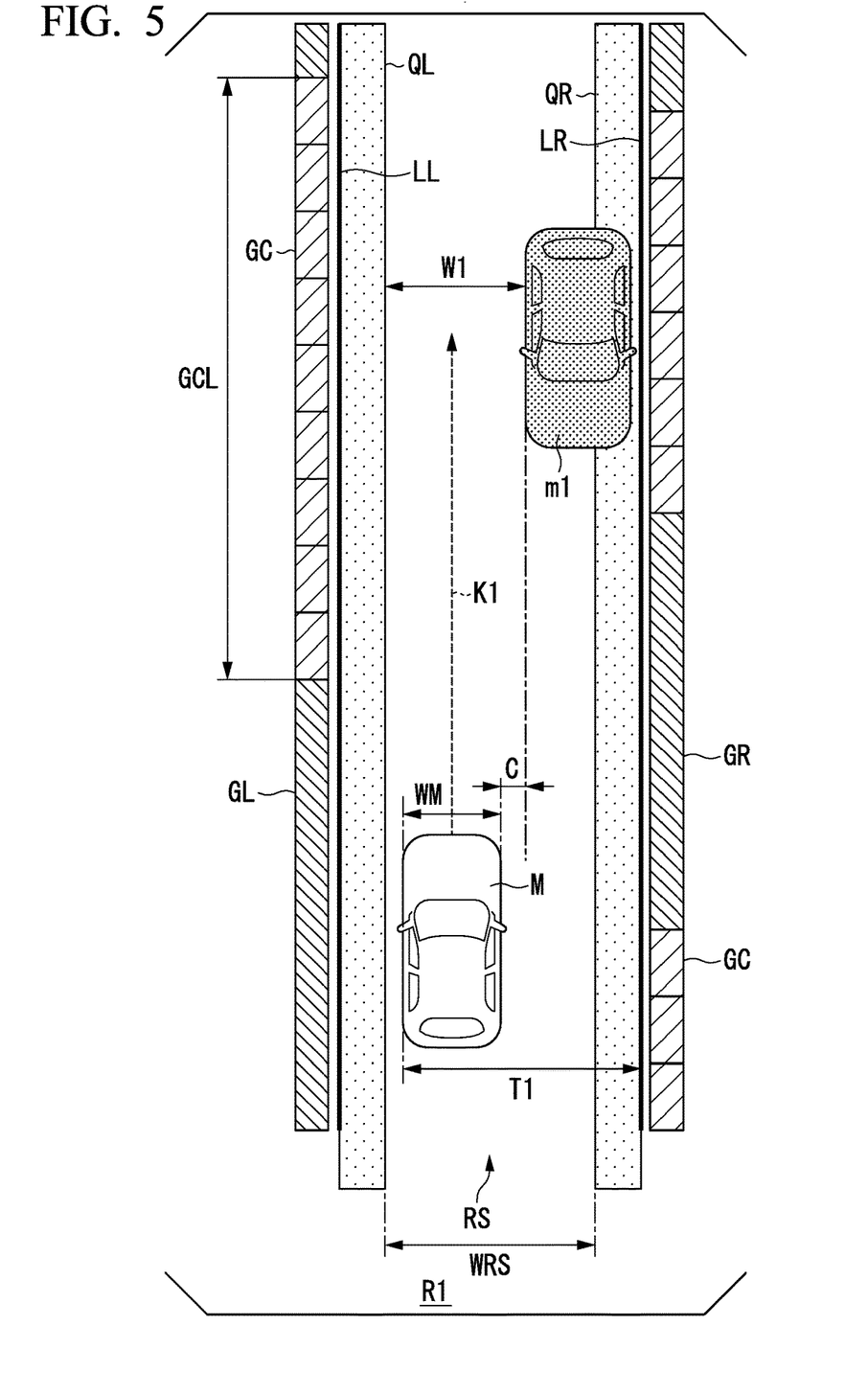
FIG. 5 is a plan view showing one example of a state in which there is an obstacle on a road.

FIG. 5 is a plan view showing one example of a state in which there is an obstacle on a road. In the example shown in FIG. 5, another vehicle (oncoming vehicle) m1 is assumed to be parked or stopped on the road R1 as one example of the obstacle.

In a case in which another vehicle m1 is recognized by the recognition unit 130, the passing determining unit 142 determines whether or not the subject vehicle M and the another vehicle m1 can pass each other.

The passing determining unit 142, for example, calculates a runnable width W1 acquired by excluding a width occupied by another vehicle M1 from a width WRS of a flat part RS of the road R1 in the crossing direction of the road RE The passing determining unit 142, for example, determines whether or not a sum value T1 of the vehicle width WM of the subject vehicle M and a marginal width C is less than the runnable width W1.

In a case in which a sum value T1 of the vehicle width WM and the marginal width C is smaller than the runnable width W1 in the flat part RS of the road R1, it is determined that the subject vehicle M can pass another vehicle m1 without passing through the road surface inclination area QL.

In a case in which the sum value T1 of the vehicle width WM and the marginal width C is equal to or larger than the runnable width W1 in the flat part RS of the road R1, the passing determining unit 142 determines that the subject vehicle M cannot pass the another vehicle m1 without passing through the road surface inclination area QL.

Figure 6:
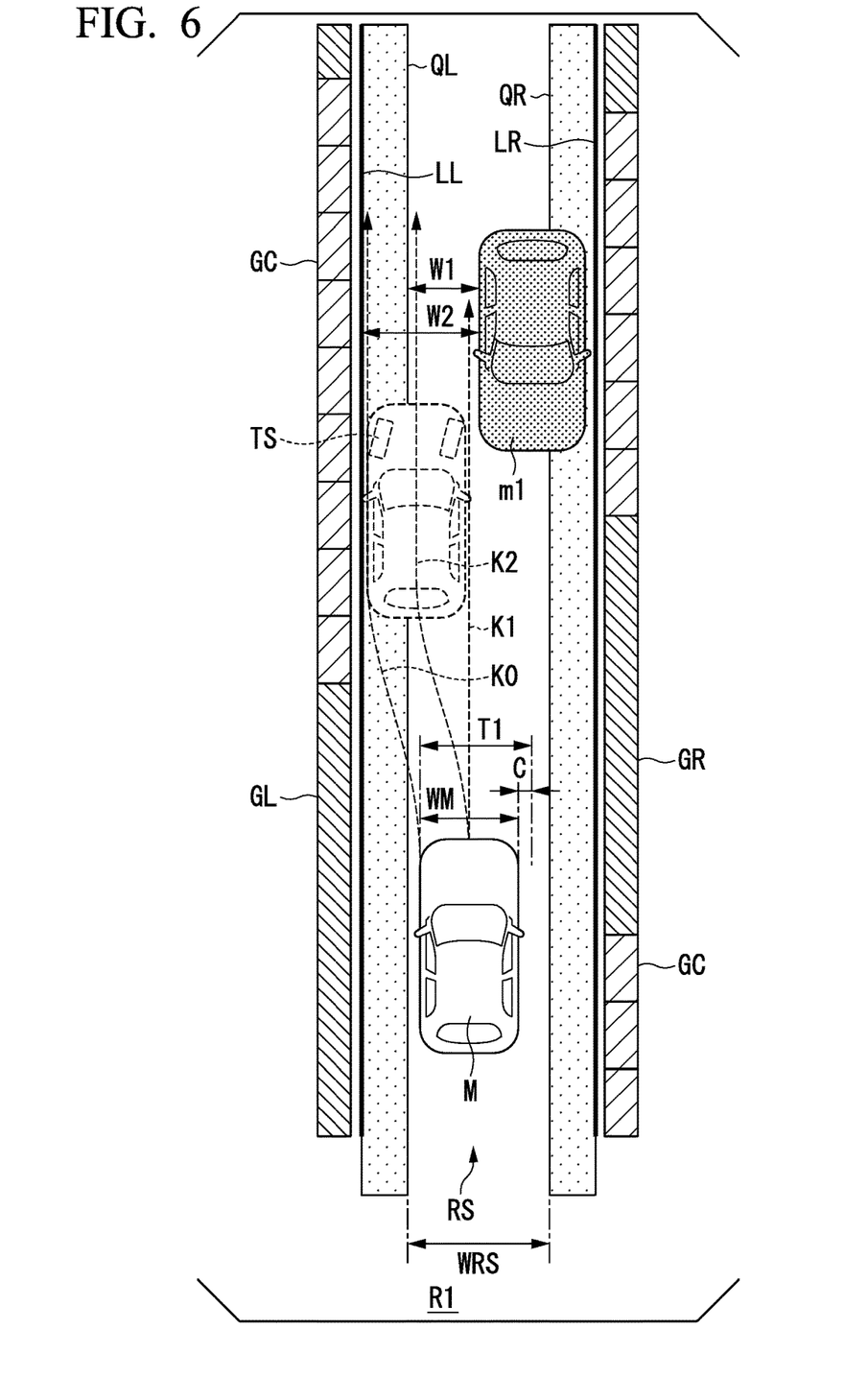
FIG. 6 is a diagram showing one example of a state in which an obstacle is avoided by causing a subject vehicle to run in a road surface inclination area.

FIG. 6 is a diagram showing one example of a state in which the subject vehicle runs on the road surface inclination area QL and avoids an obstacle. In a case in which it is determined that the subject vehicle M and the another vehicle m1 cannot pass each other in the flat part RS, the passing determining unit 142 determines whether or not the subject vehicle M and the another vehicle m1 can pass each other by running on the road surface inclination area QL. The passing determining unit 142, for example, calculates a runnable width W2 acquired by excluding a width occupied by the another vehicle m1 from a width acquired by adding the width of the road surface inclination area QL to the width of the flat part RS in the crossing direction of the road R1.

The passing determining unit 142 compares a sum value T1 of the vehicle width WM and the marginal width C with the runnable width W2 and, in a case in which the sum value T1 is smaller than the runnable width W2, determines that the subject vehicle M and the another vehicle m1 can pass each other by running on the road surface inclination area QL.

[Function of Avoidance Driving Control Unit]

The avoidance driving control unit 144 generates an avoidance locus for avoiding an obstacle on the basis of a result of determination acquired by the passing determining unit 142 and gives an instruction to the steering control unit 166. In a case in which the obstacle can be avoided by running on the road surface inclination area on the basis of the result of determination acquired by the passing determining unit 142, the avoidance driving control unit 144 generates an avoidance locus along which the vehicle wheels on one side run on the road surface inclination area. In FIG. 6, an offset locus KO is an offset locus acquired by offsetting the target locus K1 by a half of the vehicle width in the leftward/rightward direction. The avoidance driving control unit 144 generates the target locus K1 such that the offset locus passes over the road surface inclination area QL.

In the example shown in FIG. 6, the avoidance driving control unit 144 generates an avoidance locus K2 along which the subject vehicle passes the another vehicle m1 by running on the road surface inclination area QL. The avoidance driving control unit 144 causes the subject vehicle M to run along the avoidance locus K2 by instructing the second control unit 160.

[Function of Steering Control Unit]

Next, the process of the steering control unit 166 executed on the basis of a result of recognition acquired by the recognition unit 130 will be described. The steering control unit 166, basically, causes the subject vehicle M to run on the basis of the target locus generated by the action plan generating unit 140. The steering control unit 166 adjusts the steering angle of the steering device 220 by performing feed forward (FF) control and feedback (FB) control.

In a case in which the vehicle wheels of the subject vehicle M on one of the left and right sides pass through the road surface inclination area on the basis of results of recognition acquired by the inclination recognizing unit 131, the side-ditch recognizing unit 132, and the cover recognizing unit 134, the steering control unit 166 adjusts the steering angle of the steering device 220. In a section in which the offset locus described above passes through the road surface inclination area, the steering control unit 166 provides a correction steering angle for correcting a basic steering angle in a direction in which the subject vehicle M runs away from the road end by instructing the steering device 220 in addition to the basic steering angle. The direction in which the subject vehicle runs away from the road end, for example, is a direction directed from the road end toward the road center, and this direction is a direction in which the subject vehicle climbs up the gradient of the road surface inclination area.

In the example shown in FIG. 6, the steering control unit 166 instructs the steering device 220 to perform a correction steering angle toward the center of the road R1 for the steering wheels TS in addition to the basic steering angle in a section passing through the road surface inclination area QL in the offset locus KO.

Here, unless otherwise mentioned, passing of vehicle wheels on one of the left and right sides of the subject vehicle M through the road surface inclination areas QL and QR will be described as "the subject vehicle M running on the road surface inclination areas QL and QR" or the like.

In a case in which it is determined that the vehicle wheels are running on the road surface inclination area QL on the basis of a result of recognition acquired by the inclination recognizing unit 131, the steering control unit 166 may adjust the steering angle of the steering device 220 in accordance with the magnitude of the gradient of the road surface inclination area QL that has been recognized or estimated. Next, a process of calculating a correction steering angle executed by the steering control unit 166 will be described.

The steering control unit 166 sets a steering angle acquired by adding an FF correction steering angle having the road surface inclination of the road surface inclination area QL taken into account to the FF basic steering angle $\theta_{FF}$ as an FF steering angle $\theta_{FF}\#$ having the road surface inclination taken into account.

The steering control unit 166 outputs the FF steering angle to the steering device 220 and acquires an FB steering angle $\theta_{FB}(t)$ according to feedback control on the basis of a deviation between the target locus and a lateral position of the subject vehicle M. Here, the FB steering angle $\theta_{FB}(t)$ is acquired using a basic equation (1) of PID control.

$$\theta_{FB}(t) = K_p e(t) + K_i \int_o^t e(\tau)d\tau + K_d \frac{de(t)}{dt} \tag{1}$$

Here, e(t) is a deviation between the target locus K and the lateral position of the subject vehicle M. A term of a proportional constant Kp is a proportional term that changes the amount of operation in proportion to a deviation. A term of a proportional constant Ki is an integration term that changes an input value in proportion to integral of the deviation. A term of a proportional constant Ks is a differential term that changes an input value in proportion to a differential of the deviation. The FB steering angle $\theta_{FB}(t)$ is determined as a sum of three terms including the proportional term, the integral term, and the differential term. The steering control unit 166 outputs a sum $\theta_{FF}\#+\theta_{FB}(t)$ of the FF steering angle and the FB steering angle having the road surface inclination taken into account to the steering device 220 as a steering angle instruction.

In addition to (or instead of) correcting the feed forward steering angle, a constant (gain) of the feedback steering angle may be increased.

As described above, the steering control unit 166 adjusts the steering angle in accordance with the gradient of the road surface inclination area QL based on a result of recognition recognized by the inclination recognizing unit 131, and accordingly, it can be prevented that the subject vehicle M becomes close to the side ditch GL, whereby the behavior of the subject vehicle M can be stabilized. Also when one left or right wheel is positioned in the road surface inclination area, by adjusting the steering angle, the steering control unit 166 can set the direction of the subject vehicle M to be in parallel with the extending direction of the road. Accordingly, by causing the subject vehicle M to maximally deviate to the road end when passing another vehicle m1, the steering control unit 166 can maximally broaden a gap with the another vehicle m1 at the time of passing the another vehicle.

The steering control unit 166 may perform the process as described above also on a narrow road on which there is no obstacle.

[Other Case 1]

Figure 7:
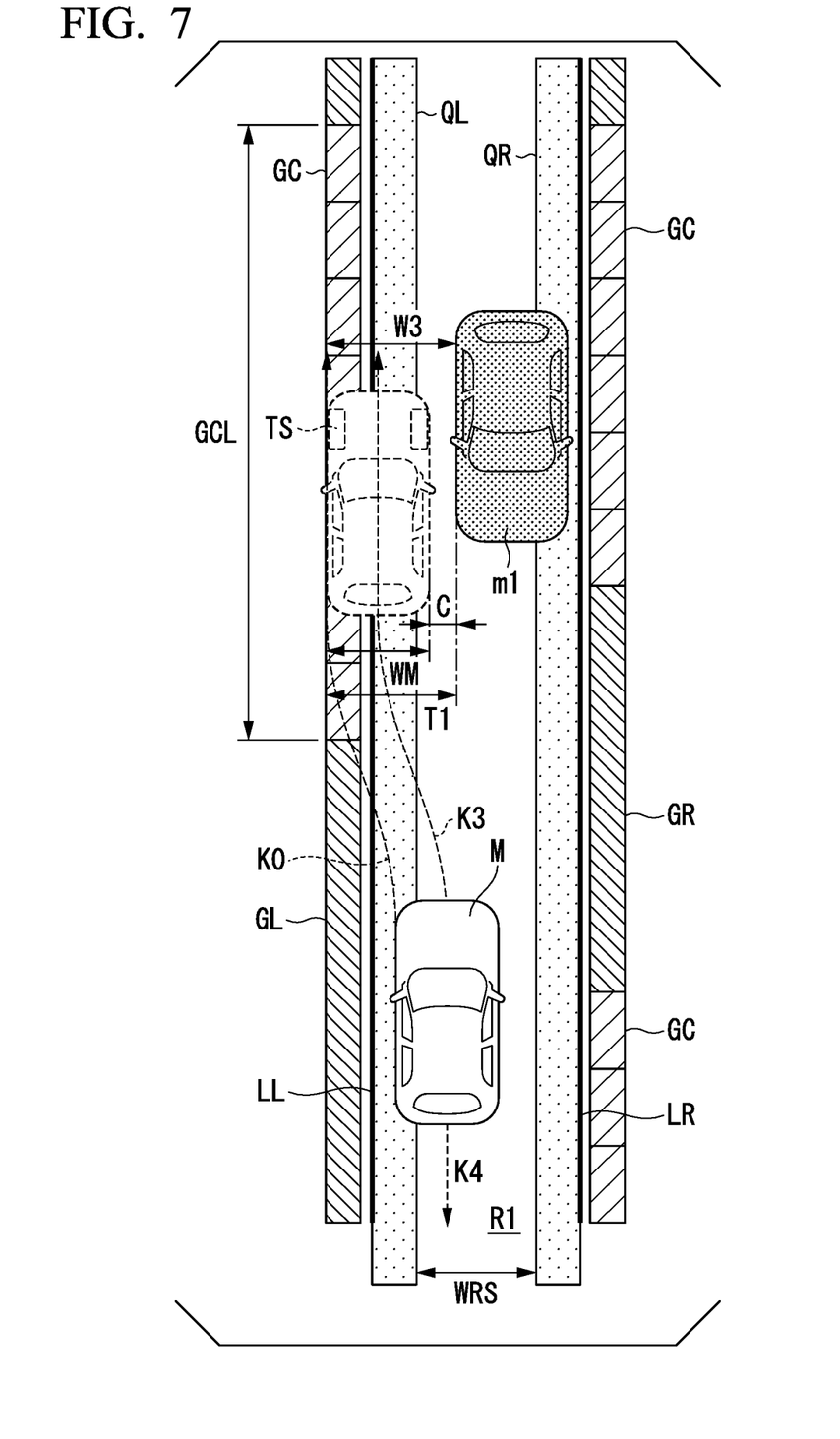
FIG. 7 is a diagram showing one example of a state in which a subject vehicle passes through a cover of a side ditch.

FIG. 7 is a diagram showing one example of a state in which a subject vehicle M passes through a cover of a side ditch. In a case in which it is determined that the subject vehicle M cannot pass another vehicle m1 by running in the road surface inclination area QL, the passing determining unit 142 determines whether or not the subject vehicle M can pass the another vehicle m1 by running on the cover GC of the side ditch GL disposed on the left side.

The passing determining unit 142, for example, calculates a runnable width W3 that is acquired by excluding a width occupied by the another vehicle m1 from a distance acquired by adding the width of the cover GC of the side ditch GL, the width of the road surface inclination area QL, and the width WRS of the flat part Rs, in the crossing direction of the road RE In the width of the cover GC of the side ditch GL, a width between the road surface inclination area QL and the flat part RS is also included. The passing determining unit 142 determines whether or not a sum value T1 of the vehicle width WM and the marginal width C is smaller than the runnable width W3. When a determination of Yes is acquired, the passing determining unit 142 determines whether or not a distance GCL that is continuous along the road R1 is equal to or longer than a predetermined distance on the basis of a result of recognition acquired by the cover recognizing unit 134.

In a case in which the distance GCL at which the cover GC is continuous along the road R1 is equal to or longer than a predetermined distance, the passing determining unit 142 recognizes a series of continuous covers GC as a flat area adjacent to the road surface inclination area. Here, the predetermined distance is a length of about 2 to 3 times the vehicle length of the subject vehicle M. The reason for this is that, in a case in which the distance is shorter than the predetermined distance, there is a high probability that the cover GC disappears until the vehicle wheels are returned to the road R1.

In a case in which a plurality of distances GCL are equal to or longer than the predetermined distance, the passing determining unit 142 determines that the subject vehicle M can pass the another vehicle m1 by passing through the continuous covers GC. The reason for this is that, in a case in which a series of covers GC are continuous for a predetermined distance or more, it can be regarded as a flat area in which the subject vehicle M can run.

The avoidance driving control unit 144 generates an avoidance locus K3 for passing through a series of covers GC on the basis of a result "Yes" of determination acquired by the passing determining unit 142. The avoidance driving control unit 144 outputs the generated avoidance locus K3 to the steering control unit 166.

In this way, by performing the process of causing the subject vehicle M to run on the cover of the side ditch, the vehicle control device 100 can reduced a calculation process executed by the steering control unit 166. The reason for this is that running on the cover GC, compared to a case in which the subject vehicle runs in the road surface inclination area QL, can stabilize the behavior of the subject vehicle M and reduce the process of control of the steering device 220.

For example, in a case in which the subject vehicle can run on the cover of the side ditch, the avoidance driving control unit 144 may generate an avoidance locus for running on the cover of the side ditch even when an avoidance locus for running on the road surface inclination area can be generated.

Other than that, the avoidance driving control unit 144 may generate an avoidance locus for avoiding a contact by stopping or retreating the subject vehicle M or the like as a candidate even in a case in which the subject vehicle cannot pass another vehicle m1 even by passing through the road surface inclination area or the cover. In the example described above, an avoidance locus K4 for retreating the subject vehicle M is generated. Also when the subject vehicle M is caused to retreat, the avoidance driving control unit 144 may generate an avoidance locus K4 on the basis of a result of recognition acquired by the inclination recognizing unit 131 or the cover recognizing unit 134.

In a case in which the speed of the subject vehicle M is equal to or lower than a predetermined value, the avoidance driving control unit 144 may direct the steering control unit 166 to correct the steering angle of the steering device at which the subject vehicle M runs. The road R1 requiring the avoidance operation as described above has a small width, and thus the subject vehicle M is assumed to run at a low speed. The reason for this is that, in a case in which the subject vehicle M runs at a high speed, the subject vehicle M is in the state of running on a wide road R1, and accordingly, there is a low possibility of the subject vehicle M running at the end of the road R1.

For this reason, the avoidance driving control unit 144 corrects the steering angle of the steering device 220 in a case in which the subject vehicle M runs at a low speed, whereby the calculation load of the vehicle control device 100 can be reduced. The process executed by the vehicle control device 100 described above may also be applied to a case in which the subject vehicle overtakes the obstacle from the right side and runs on the road surface inclination area QR or the cover GC of the side ditch GR.

[Process Flow]

Figure 8:
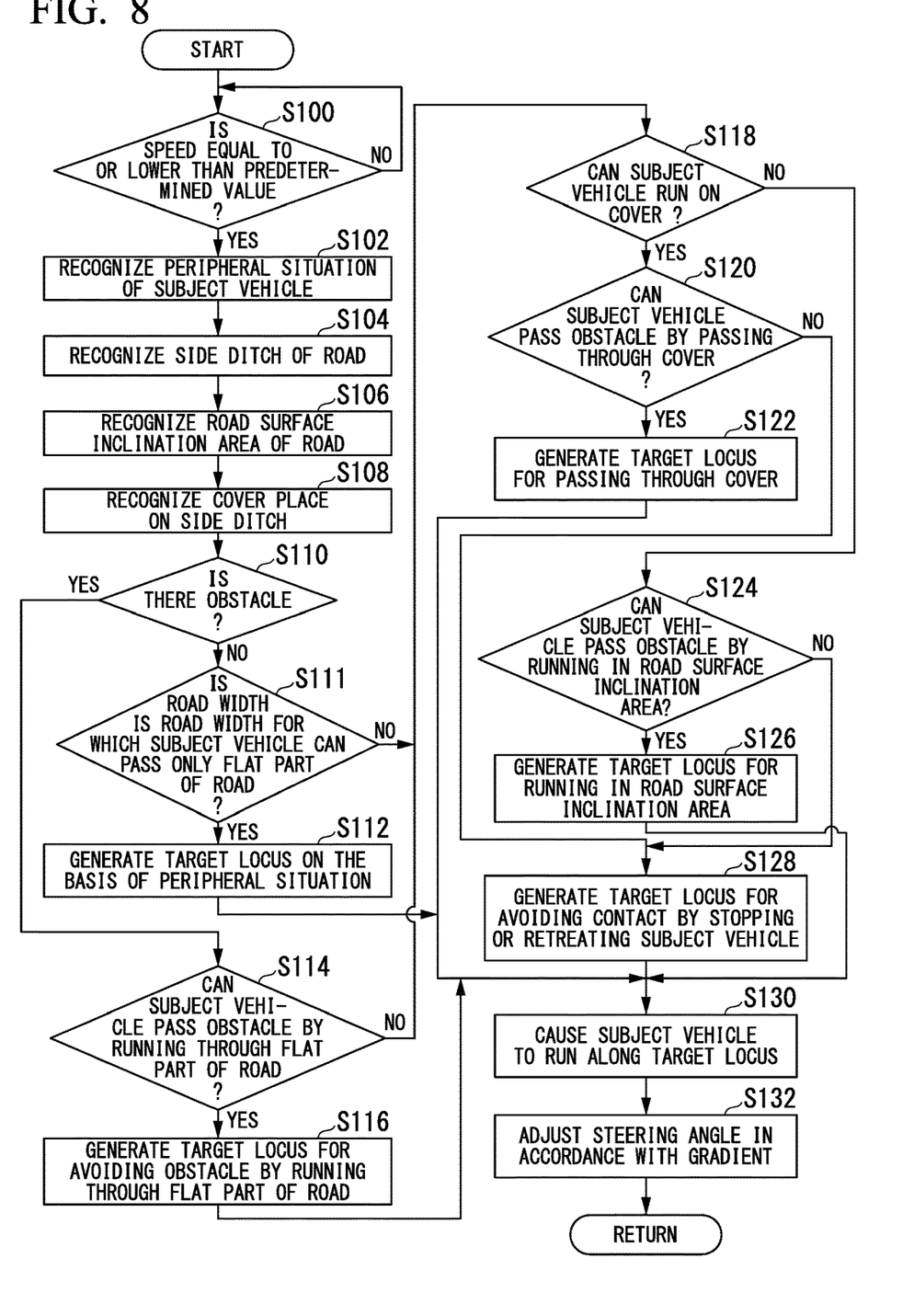
FIG. 8 is a flowchart showing one example of the flow of another process executed by a vehicle control device according to an embodiment.

Next, running control of the subject vehicle M in a case in which an obstacle on a road R1 is avoided will be described. FIG. 8 is a flowchart showing one example of the flow of another process executed by the vehicle control device 100 according to an embodiment. The following flowchart is executed for every predetermined distance or a predetermined timing.

The driving control unit determines whether or not the speed of the subject vehicle M is equal to or lower than a predetermined value (Step S100). In a case in which a result "No" of the determination is acquired in Step S100, the driving control unit continues the determination process. On the other hand, in a case in which a result "Yes" of determination is acquired in Step S100, the recognition unit 130 recognizes a peripheral situation of the subject vehicle (Step S102). Next, the side-ditch recognizing unit 132 recognizes a side ditch that is adjacent to a road end (Step S104).

Next, the inclination recognizing unit 131 recognizes a road surface inclination area adjacent to the side ditch (Step S106). Next, in a case in which the side ditch is recognized by the side-ditch recognizing unit 132, the cover recognizing unit 134 recognizes a cover placed on the side ditch (Step S108). Next, the recognition unit 130 determines whether or not there is an obstacle in front of the running road (Step S110).

In a case in which it is determined that there is no obstacle, the action plan generating unit 140 determines whether or not the road has a road width for which the subject vehicle can pass through only a flat part of the road (Step S111). In a case in which a result "Yes" of the determination is acquired, the action plan generating unit 140 generates a target locus on the basis of the peripheral situation of the subject vehicle (Step S112). On the other hand, a result "No" of the determination is acquired in Step S111, the action plan generating unit 140 causes the process to proceed to Step S118.

In a case in which it is determined that there is an obstacle in Step S110, the passing determining unit 142 determines whether or not the subject vehicle can pass the obstacle by running in the flat part of the road (Step S114). In a case in which it is determined that the subject vehicle can pass the obstacle by running in the flat area of the road, the avoidance driving control unit 144 generates a target locus for avoiding the obstacle by running in the flat part of the road (Step S116).

In a case in which a result "No" of the determination is acquired in Step S114, the passing determining unit 142 determines whether or not the subject vehicle M can run on the cover (Step S118). In a case in which a result "Yes" of the determination is acquired in Step S118, the passing determining unit 142 determines whether or not the subject vehicle can pass the obstacle by passing through the cover GC (Step S120). In a case in which a result "Yes" of the determination is acquired in Step S120, the avoidance driving control unit 144 generates a target locus for passing through the cover GC (Step S122). In a case in which a result "No" of the determination is acquired in Step S118, the passing determining unit 142 determines whether or not the subject vehicle can pass the obstacle by running in the road surface inclination area (Step S124).

On the other hand, in a case in which a result "Yes" of the determination is acquired in Step S124, the steering control unit 166 generates a target locus for running in the road surface inclination area (Step S126). In a case in which a result "No" of the determination is acquired in Step S120 or Step S124, the avoidance driving control unit 144 generates a target locus for avoiding a contact by stopping or retreating the subject vehicle M (Step S128). Next, the second control unit 160 causes the subject vehicle M to run along the target locus determined by the process of Step S112, S116, S122, S126, or S128 (Step S130). Next, in a case in which the road surface inclination area is recognized, the steering control unit 166 directs the steering device 220 to adjust the steering angle in accordance with the gradient of the road surface inclination area (Step S132). In this way, the process of this flowchart ends. The order of the steps described above may be changed appropriately.

According to the embodiment described above, the vehicle control device 100 can limit disturbances of the vehicle according to the shape of the road surface of the road. In a case in which the subject vehicle runs on a road in which an inclination area is disposed, the vehicle control device 100 recognizes a series of covers of the side ditch on which the subject vehicle can run and causes the subject vehicle M to run on the cover, and accordingly, the process of control of the steering device 220 according to the inclination can be reduced.

[Hardware Configuration]

Figure 9:
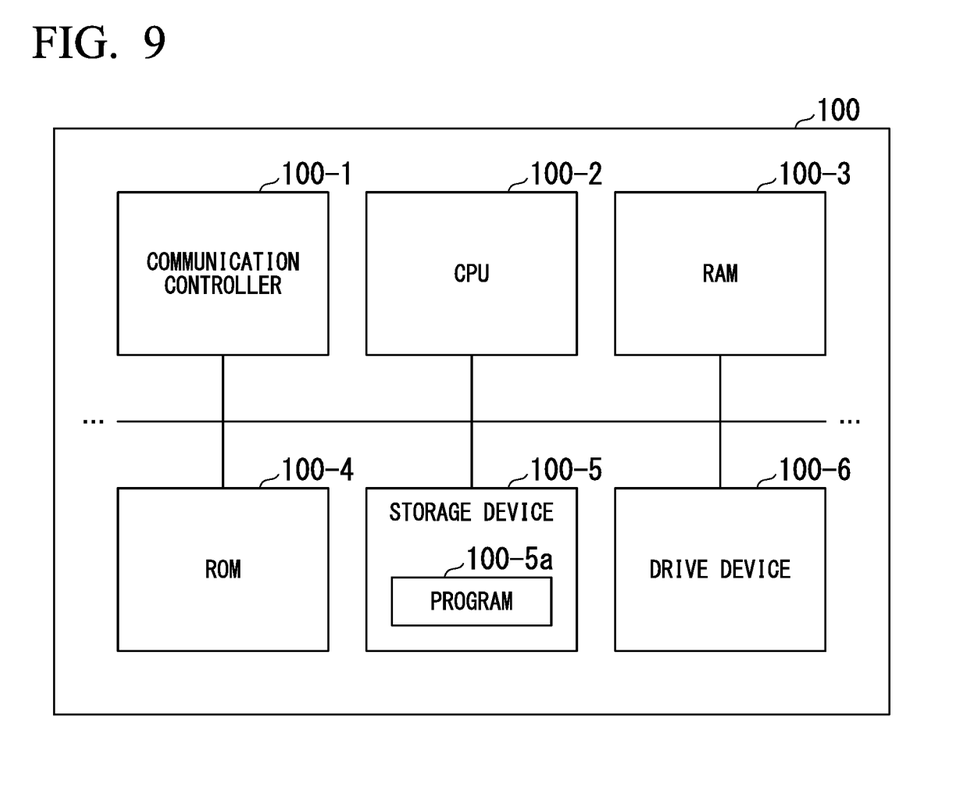
FIG. 9 is a diagram showing one example of the hardware configuration of an automated driving control device according to an embodiment.

FIG. 9 is a diagram showing one example of the hardware configuration of the vehicle control device 100 according to an embodiment. As shown in the drawing, the vehicle control device 100 has a configuration in which a communication controller 100-1, a CPU 100-2, a random access memory (RAM) 100-3 used as a working memory, a read only memory (ROM) 100-4 storing a boot program and the like, a storage device 100-5 such as a flash memory or an hard disk drive (HDD), a drive device 100-6, and the like are interconnected through an internal bus or a dedicated communication line. The communication controller 100-1 communicates with constituent elements other than the vehicle control device 100. A program 100-5a executed by the CPU 100-2 is stored in the storage device 100-5.

This program is expanded into the RAM 100-3 by a direct memory access (DMA) controller (not shown in the drawing) or the like and is executed by the CPU 100-2. In this way, some or all of the inclination recognizing unit 131, the side-ditch recognizing unit 132, the cover recognizing unit 134, the passing determining unit 142, and the avoidance driving control unit 144 are realized.

The embodiment described above can be represented as below.

A vehicle control method including a storage device storing a program and a hardware processor and configured such that the hardware processor, by executing the program stored in the storage device, recognizes a peripheral situation of a vehicle, controls at least steering of the vehicle on the basis of a result of recognition, and a vehicle control system configured to recognize a road surface inclination area, which is disposed at the road end in an advancement direction of the vehicle and adjust a steering angle of the vehicle in a direction in which the vehicle is away from the road end on a side on which the road surface inclination area is present in a case in which the vehicle runs on the road surface inclination area.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
at least one memory storing instructions, and
at least one processor configured to execute instructions to:
recognize a peripheral situation of a vehicle; and
control at least steering of the vehicle on the basis of a result of recognition acquired,
recognize a road surface inclination area in which a gradient toward a lower side in a vertical direction is formed from a flat part of the road toward a road end, and which is disposed at the road end of an advancement direction of the vehicle, and
in a case in which the vehicle is running on the road surface inclination area, adjust a steering angle of the vehicle in a direction in which the vehicle is away from the road end on a side on which the road surface inclination area is present,
recognize a presence and a width of a side ditch present on a side farther from a center part of the road than the road surface inclination area, and
determine an amount of adjustment of the steering angle in accordance with a width of the side ditch.

2. The vehicle control device according to claim 1, wherein the at least one processor is further configured to:
cause the vehicle to run in the flat area in a case to recognize a flat area, which is adjacent to the road surface inclination area, farther from a center part of the road than the road surface inclination area.

3. The vehicle control device according to claim 1, wherein the at least one processor is further configured to:
execute a process for adjusting the steering angle of the vehicle in a direction in which the vehicle is away from the road end on a side on which the road surface inclination area is present in a case in which a speed of the vehicle is equal to or lower than a predetermined value.

4. The vehicle control device according to claim 1, wherein the at least one processor is further configured to:
recognize a gradient of the road surface inclination area, and
determine an amount of adjustment of the steering angle in accordance with the gradient recognized.

5. The vehicle control device according to claim 1, wherein the at least one processor is further configured to:
cause the vehicle to run in the road surface inclination area in a case in which an obstacle is unavoidable in the flat part of the road.

6. A vehicle control method in which a vehicle control device is configured to recognize a peripheral situation of a vehicle and controls at least steering of the vehicle on the basis of a result of recognition, the vehicle control method comprising:
recognizing a road surface inclination area, which is disposed at the road end of an advancement direction of the vehicle, in which a gradient toward a lower side in a vertical direction is formed from a flat part of the road toward a road end,
adjusting a steering angle of the vehicle in a direction in which the vehicle is away from the road end on a side on which the road surface inclination area is present in a case in which the vehicle runs on the road surface inclination area;
recognizing a presence and a width of a side ditch present on a side father from a center part of the road than the road surface inclination area, and
determining an amount of adjustment of the steering angle in accordance with a width of the side ditch.

7. A computer-readable non-transitory storage medium having a program stored thereon, the program causing a vehicle control device to execute:
recognizing a peripheral situation of a vehicle; and
controlling at least steering of the vehicle on the basis of a result of recognition,
wherein the program causing the vehicle control device to execute:
recognizing a road surface inclination area, which is disposed at the road end of an advancement direction of the vehicle, in which a gradient toward a lower side in a vertical direction is formed from a flat part of the road toward a road end,
adjusting a steering angle of the vehicle in a direction in which the vehicle is away from the road end on a side on which the road surface inclination area is present in a case in which the vehicle runs on the road surface inclination area, recognizing a presence and a width of a side ditch present on a side father from a center part of the road than the road surface inclination area, and determining an amount of adjustment of the steering angle in accordance with a width of the side ditch.

\* \* \* \* \*